(12) United States Patent
Case

(10) Patent No.: US 10,395,288 B2
(45) Date of Patent: Aug. 27, 2019

(54) METHODS AND SYSTEMS FOR A PRIVATE MARKET: FACILITATING CONNECTIONS BETWEEN BUYERS AND SELLERS OR EXCHANGERS OF PRODUCTS AND SERVICES WHILE MAINTAINING PRIVACY

(75) Inventor: Janet E. Case, Menlo Park, CA (US)

(73) Assignee: Collabra Technology, Inc., Spokane, WA (US)

( * ) Notice: Subject to any disclaimer, the term of this patent is extended or adjusted under 35 U.S.C. 154(b) by 934 days.

(21) Appl. No.: 12/166,157

(22) Filed: Jul. 1, 2008

(65) Prior Publication Data
US 2009/0012874 A1  Jan. 8, 2009

Related U.S. Application Data

(60) Provisional application No. 60/958,120, filed on Jul. 3, 2007.

(51) Int. Cl.
*G06Q 30/00* (2012.01)
*G06F 17/30* (2006.01)
*G06Q 30/06* (2012.01)

(52) U.S. Cl.
CPC ......... *G06Q 30/06* (2013.01); *G06Q 30/0615* (2013.01); *G06Q 30/0617* (2013.01)

(58) Field of Classification Search
CPC .................................................. G06Q 30/06
USPC ................................................. 705/26–27.2
See application file for complete search history.

(56) References Cited

U.S. PATENT DOCUMENTS

| | | | | |
|---|---|---|---|---|
| 6,658,394 | B1 * | 12/2003 | Khaishgi et al. | 705/58 |
| 2002/0007335 | A1 * | 1/2002 | Millard et al. | 705/37 |
| 2003/0023451 | A1 * | 1/2003 | Willner et al. | 705/1 |
| 2003/0204445 | A1 | 10/2003 | Vishik et al. | |
| 2004/0039663 | A1 | 2/2004 | Kernz | |
| 2005/0102195 | A1 * | 5/2005 | Kuehr-McLaren et al. | 705/26 |
| 2005/0187786 | A1 * | 8/2005 | Tsai | 705/1 |
| 2005/0240531 | A1 | 10/2005 | Wolff, Jr. | |
| 2005/0289017 | A1 * | 12/2005 | Gershom | 705/27 |
| 2006/0026090 | A1 * | 2/2006 | Balabon | 705/37 |
| 2006/0265323 | A1 | 11/2006 | Winter et al. | |
| 2007/0040654 | A1 * | 2/2007 | Lee et al. | 340/10.1 |
| 2007/0043770 | A1 * | 2/2007 | Goodrich et al. | 707/104.1 |
| 2007/0088652 | A1 | 4/2007 | Firmage et al. | |
| 2008/0133716 | A1 * | 6/2008 | Rao et al. | 709/220 |

OTHER PUBLICATIONS

Angeles, R. (2007). An empirical study of the anticipated consumer response to RFID product item tagging. Industrial Management & Data Systems, 107(4), 461-483. doi:http://dx.doi.org/10.1108/02635570710740643.*
International Search Report, PCT/US 08/08297, dated Oct. 1, 2008.
Written Opinion, PCT/US 08/08297, dated Oct. 1, 2008.

* cited by examiner

Primary Examiner — Kathleen Palavecino
(74) Attorney, Agent, or Firm — DLA Piper LLP (US)

(57) ABSTRACT

A system and method are described that facilitate bilateral private interaction between participants who wish to initiate personal or business arrangements anonymously or without exposure except to identified trusted parties and the system and method act as an intermediary allowing the participants, typically buyers and sellers, to be matched based upon requests for and offers of goods and services, without revealing the identity or other identifying information about either the items or the participants until the participants choose to reveal that information.

32 Claims, 7 Drawing Sheets

RELATIONSHIP MATRIX, TO DETERMINE DISPLAY OF SEARCH RESULTS

| | | RELATIONSHIP LEVEL OF REQUESTOR | | |
|---|---|---|---|---|
| | | OWNER | NETWORK PARTNER | NOT NETWORK PARTNER |
| PRIVACY LEVEL OF PRODUCT OR SERVICE | PUBLIC | FULL DISPLAY | NETWORK DISPLAY | PUBLIC DISPLAY |
| | NETWORK PRIVATE | FULL DISPLAY | NETWORK DISPLAY | PRIVATE DISPLAY |
| | PRIVATE | FULL DISPLAY | PRIVATE DISPLAY | PRIVATE DISPLAY |

METHODS AND SYSTEMS FOR A PRIVATE MARKET: FACILITATING CONNECTIONS BETWEEN BUYERS AND SELLERS OR EXCHANGERS OF PRODUCTS AND SERVICES WHILE MAINTAINING PRIVACY

PRIORITY CLAIM

This application claims the benefit under 35 USC 119(e) to U.S. Provisional Patent Application Ser. No. 60/958,120 filed on Jul. 3, 2007 and entitled "Methods and Systems for a Private Market: Facilitating Connections between Buyers and Sellers or Exchangers of Products and Services while Maintaining Privacy", the entirety of which is incorporated herein by reference.

FIELD

The system relates generally to a private marketplace.

BACKGROUND

Due to the openness of standard electronic communications and the exposure created by information posted on the Internet, participants in certain transactions are increasingly concerned about privacy, especially in situations where the identity of either the items or the participants in the transaction might cause unwanted attention or risk. This concern creates a tension between the desire to maintain privacy, and the desire or need to advertise a product or service or directly participate in a transaction. Typically these transactions are characterized by having an entity that wishes to make a purchase or exchange of goods or services, and another entity that wishes to make a sale or exchange of goods or services.

Typically, transactions or markets where the need for privacy is highly desired are markets for the sale, exchange or donation of high-value or easily identified items such as real estate or other property such as jewelry, art, antiques and so on, or personal transactions or markets such as those for jobs, or personal or business relationships. Thus, it is desirable to provide a private market system and method that protects the identity of either the items or the participants in the transaction until the appropriate time or until permitted by the participants, or that selectively allows access to certain information about the items and/or participants depending on who is requesting to see it, and it is to this end that the system and method are directed.

BRIEF DESCRIPTION OF THE DRAWINGS

FIG. 1B illustrates a decision matrix that may be used by the private market system shown in FIG. 1A;

FIG. 5 is a sample user interface screen that shows an implementation of the system and method with the purpose of transacting real estate transactions; and FIG. 6 is a sample user interface screen that shows an implementation of the system and method with the purpose of displaying results from a real estate search.

DETAILED DESCRIPTION OF ONE OR MORE EMBODIMENTS

Figure 1A:
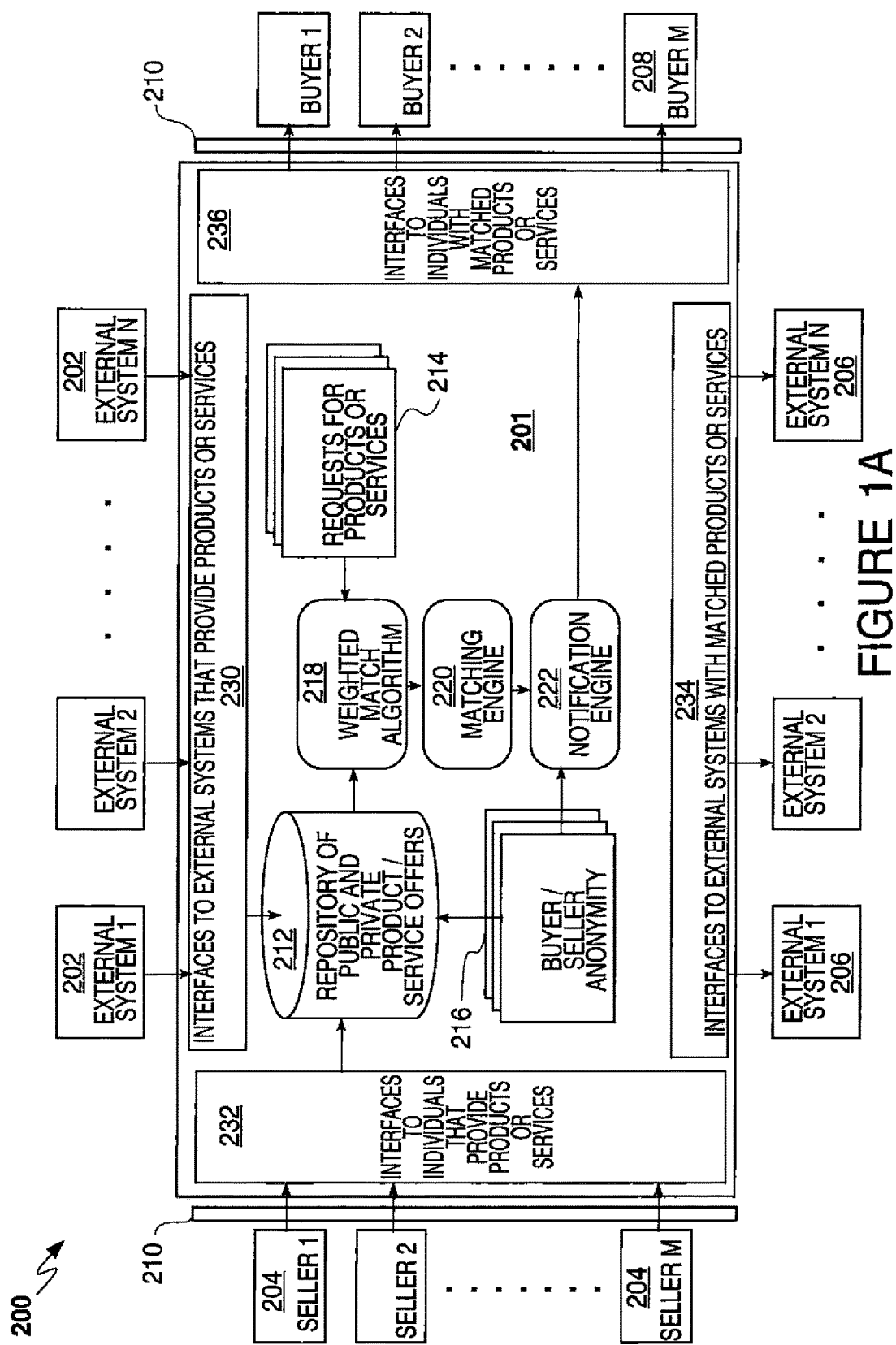
FIG. 1A is a schematic representation of an implementation of a system for a private market showing the main input of requests from 'Sellers', some of the processing elements and the output to 'Buyers'.

The system and method are particularly applicable to a web-based real estate transaction system and method and it is in this context that the system and method will be described. It will be appreciated, however, that the system and method has greater utility because the system and method may be used for industries or transactions other than real estate where there is a desire for private exchanges between two or more parties that need to be mediated is some fashion and the system and method may be implemented using other technologies instead of the web-based system described below The other industries or transactions in which private exchanges between two or more parties that need to be mediated may exist may include markets for the sale, exchange or donation of high-value or easily identified items such as real estate or other property such as jewelry, art, antiques and so on, or personal transactions or markets such as those for jobs, or personal or business relationships. The system and method used in other industries and transactions in which private exchanges between two or more parties that need to be mediated and/or implemented with other technologies are within the scope of the invention.

The private market system and method may be used in several different situations. For example, the system and method may be used when the buyer wants to see all available offers without pressure from sellers or agents; or may not be ready to act until just the right offer comes along; or does not want to identify him or herself to agents or sellers. As another example, the system and method may be used when the seller does not want too many contacts from unqualified buyers; does not want direct contacts or pressure from agents; does not want family, neighbors or others to know the item is for sale; or might not be ready to sell unless just the right buyer comes along. An another example, the system and method may be used when agent representing a seller wants to expose items just to potential buyers and not to other agents; wants to know a buyer's preferences and intentions before exposing the availability of an item; has been instructed by a seller not to advertise the item to the general public; or the agent representing a buyer wants to see items that match the buyer's needs so he can initiate a transaction. The private market system and method may include one or more item privacy settings (public, private or network private) and may provide one-to-one or one-to-many networks among which network private information can be shared as described in more detail below with reference to FIG. 1B. The network private designation allows an item owner (or his agent) to share information/items (such as a new property listing) with one or more users who the item owner or agent trusts.

The system and method provides an intermediary to match requests for products and services against offers of the same, and vice versa. The system and method provide the ability for participants on both sides of the transaction to participate privately, and for the goods or services to be generally described but not specifically identified until a level of mutual interest is established between the parties or when there is a network established between two or more parties who are part of the private market system. The system and method provides a 'logically central location' to which a party (one or more entities or people or systems) can make requests for bids, products, services and other items from a second party (similarly one or more entities or people or systems). The logically central location may be implemented as an actual central location or may in fact be a distributed set of computer systems distributed over a wide geographic region.

Broadly, the system and method provide the ability to form matches between agents where one or both parties wish to remain anonymous or to offer goods that would be easily identifiable if their full details were known. This applies both to the buy side and the sell side, where one or both parties, or a plurality of parties, wish for some information about the item or the party to remain private. Instances where the current invention applies in specific markets include real estate, employment, relationships, home exchanges, art, jewelry or other valuables, and so on.

The system and method thus allows the direct participation of the buyer (or his agent) in the transaction process, while allowing the buyer to retain full control of their privacy and their desire to participate in the transaction. Similarly, the system and method allows the direct participation of the seller (or his agent) in the transaction process, while allowing the seller to retain full control of their privacy and their desire to participate in the transaction. The system and method also facilitates bilateral private interaction between sellers and buyers or their agents in a marketplace or situation where there might otherwise be unwanted exposure. More specifically, the system and method are an electronic virtual market that stores product or service information designated by sellers as public or private, and stores requests from buyers for products and services, and allows for the matching of sellers and buyers based upon both the requested product and service as well as whether such requests are public or private and/or based on whether the buyer (or his agent) is in the network of the seller (or his agent). A first embodiment of the system and method allows the direct connection between one or a plurality of buyers and sellers or agents to initiate a confidential exploration of the goods or services, and only to reveal identities or details when ready to initiate or effect a negotiation or transaction. A second embodiment of the system and method allows a general request to be made in the global marketplace for goods or services that are fulfilled by the system matching an equivalent offer made for sale, either in the past, in the present, or in the future.

The system and method also allows for time independence of performing the match from the seller and buyer or their agents—meaning that a buyer or agent could make a request for goods or services that may currently be offered through the system or that one or more sellers or agents may place in the system at some point in the future. In this latter circumstance, the system and method may still perform the match so long as the buyer's request is still active. The system and method also allows for offers of services or goods to be made in the present and to be presented at some point in the future, should a buyer later request relevant goods or services. The system and method also allows for the buyer or seller or their agents to specify the degree of "match" that is required for the system to identify and return a match, so that items that are similar but not exact will also be displayed as "matches."

Using the system and method, a seller or agent generates a posting to the electronic market, using a standard browser interface or other input device, which represents a way for the seller or agent to interact with the system or designates through some other system that the information is to be uploaded to the system. The system and method provide for the seller or agent to be trusted in this sense that they are a bona fide user of the system. An embodiment of the system will use standard security protocols to determine authentication and authorization as a minimum. A more sophisticated embodiment will use two-factor authentication for individuals, or some form of tokenized assertions similar to SAML for interactions between federated systems. The implication here is that the buyer or seller or their agents may use an intermediate proxy, typically another computer system computer application, to interact with the system.

Now, an example of an implementation of the private market system and method will be described although the system and method may be implemented with other technologies, functions and architectures that are all within the scope of the private market invention. In the following descriptions, the terms Seller and Buyer also include the instance of one or more agents representing and/or acting on behalf of the seller and/or buyer.

FIG. 1A is a schematic representation of an implementation of a system 200 for a private market showing the main input of requests from 'Sellers', some of the processing elements and the output to 'Buyers'. The system may be implemented as distributed computer architecture or a client/server architecture and the system is not limited to the particular architecture of the system. In an exemplary embodiment, the system is implemented using one or more processing unit based devices (such as for example, server computers, personal computers, personal digital assistant (PDA) devices, converged electronic devices such as the Blackberry, cellular phone devices, mobile phone devices and the like) wherein each buyer and each seller interacts with the system using their buyer/seller processing unit based device. The system 200 may include a private market unit 201 that coordinates and manages the private markets between one or more selling parties and one or more buying parties.

The private market unit may be implemented, for example, as one or more server computers that execute a plurality of lines of computer code to implement the operations and functions of the private market unit as described below. The system 200 may receive information on products or services either from one or more external systems 202 or from one or more selling parties 204 (such as an entity, person or system). The system may include a set of interfaces 230, 232, 234, 236 that permit the system to interface with the external systems or parties that allows for specialization for electronic data interchange to those systems on a per system basis. The interface may include the usual credit card processing to one of the third-party processors or payment aggregators. Integration of these systems with a services oriented system implementation has become standard. The system uses these existing services to facilitate any payments transactions as necessary rather than rebuilding this service. The system 200 may also receive information on matched products or services either from one or more external systems 206 or from one or more buying parties 208 (such as an entity, person or system).

The system may include a repository 212 that stores the public and private product/service offers provided by the one or more external systems 202 or from the one or more selling parties 204. In one embodiment, the repository 212 may be a relational database management (RDBMS) system that is implemented as a relational database. The request for products and services (from the buying parties 208) are maintained in a repository 214, such as a relational database management (RDBMS) in one embodiment and may be stored in the same database system as the repository 212, that has sufficient index keys to allow these requests to be retrieved in order of time. A process 218 (implemented as a weighted match algorithm in one embodiment with one or more lines of computer code executed by a processing unit of the private market unit 201) matches up the requests against the available pool of products and services 212 to determine if a suitable match exists. A matching engine 220 is responsible for selecting possible matches and providing these possible matches to a notification engine 222 that, based on buyer and seller preferences about anonymity (stored in a repository 216 that may be a relational database management (RDBMS) in one embodiment) delivers these matches to the destination buyers 208 or external systems 206. The matching engine 220 and notification engine 222 each may be implemented as one or more lines of computer code executed by a processing unit of the private market unit 201. The communication between the sellers 204, and the buyers 208 may be facilitated through standard browser interfaces and Internet connectivity 210.

When a request is made for a product or service, the system determines the level of privacy attached to the product or service, and the anonymity required by both the seller and buyer based on the repository 216. To this end, a store 216 of relevant parameters are kept for the products and services and for both buyer and seller that allow the matching engine to produce the correct matches not only based on the product parameters, but also on the required level of exposure for both buyer and seller. The system 200 may further include a network unit (not shown in FIG. 1A) that allows users of the system to identify other users who may be part of the user's private network. In one implementation, the network unit may be one or more pieces of software.

FIG. 1B illustrates a decision matrix that may be used by the private market system shown in FIG. 1A. In particular, each item (product or service as shown in FIG. 1A) in the system may have one or more different privacy levels such as public, private and network private. A public item may be shared with anyone else who is part of the system 200. A private item may not be shared with anyone else in the system 200 unless authorized to do so by the owner of the item. A network private item may be shared with users who are part of the network of the item owner and then shared with other users if authorized by the owner of the item. Thus, as shown in FIG. 1B, the owner of the item can view items that are public, private or network private. A network partner of the item owner (designated as such by the item owner) can see the public items and the network private items while a user who is not part of the network can only see the public items. Rules about how much information is displayed at each level of privacy may be pre-determined by the system or may be set by the owner of (or agent) the item. The rules shown in FIG. 1B about the amount of information to be shown in the search results display (public, private or network) may be global defaults within the system, or may be set by the owner of the product or service.

Figure 2:
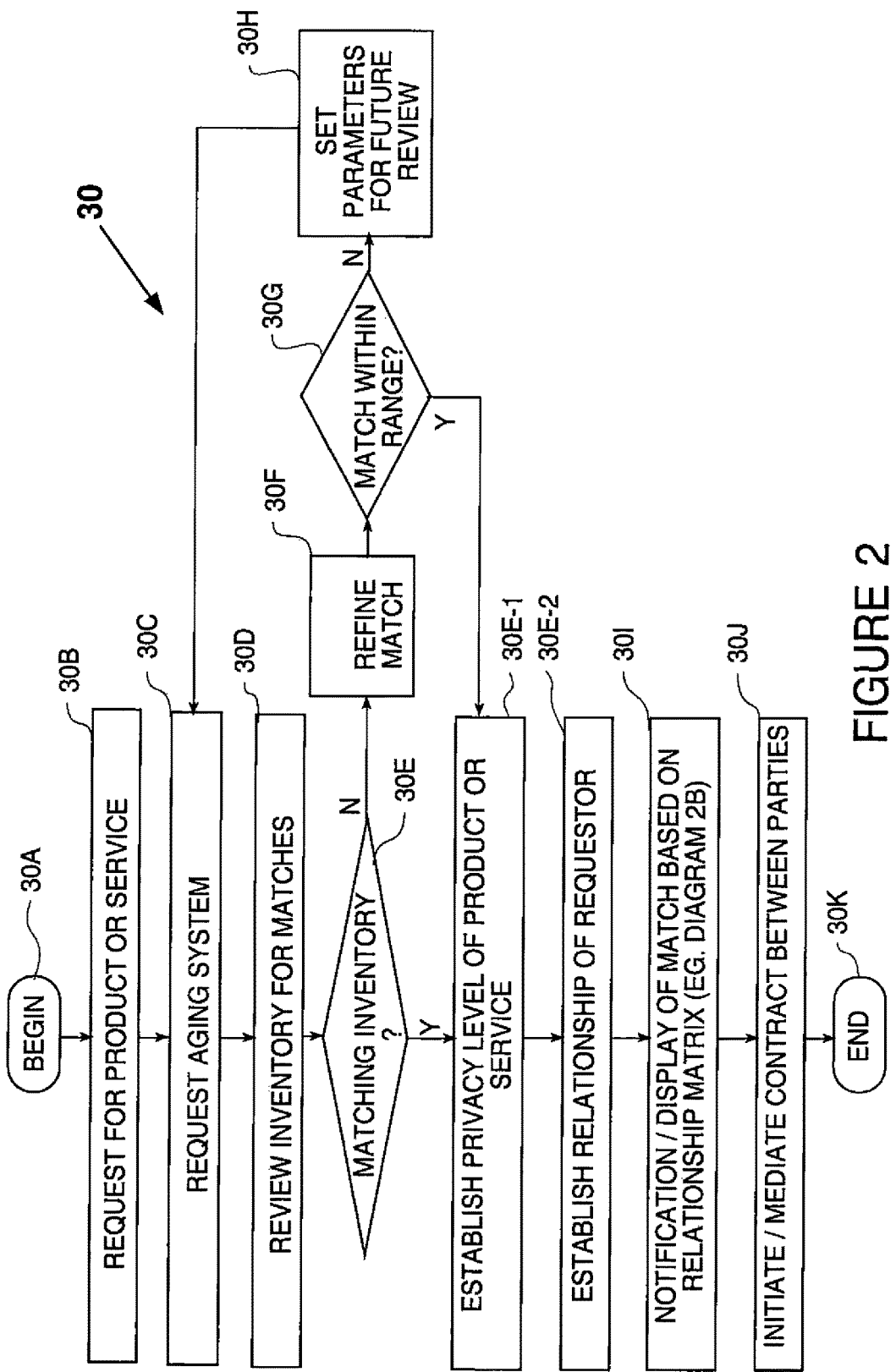
FIG. 2 illustrates a method for matching requests of the system in FIG. 1A.

FIG. 2 illustrates a method 30 for matching requests of the system in FIG. 1A that is carried out by the matching engine 220. The method starts (30A) and the matching engine receives a request from a product of service (30B) and requests aging system (30C). Next, the matching engine reviews the inventory for matches (30D) and determines if there are any matches (30E). If there are not any matches, the matching engine may refine the matches (30F) such as by adjusting the criteria and then determine if the resultant matches are within the range (30G). If the matches are not within the range, then the parameters are set for future review (30H) and the matching engine returns to requesting an aging system (30C). If the matches are within the range (for the refined match), then the matching engine generates a notification of a match (30I), displays whatever amount of information is allowed based on the privacy level of the item (30E-1) and the relationship of the entity making the request (30E-2) and provides a means of contact based on the degree of privacy of the parties. The matching engine may then initiate a means of contact between the parties (30J) and the first stage of the matching process is completed (30K). In a second stage of the matching, if further interest is shown by either party via a response to system notifications, then more information may be displayed based on the privacy level of the item or the privacy level of the participants, or the participants may request a change in their relationship to permit more disclosure. Returning to the initial match determination (30E), if the match is found within refining the match, then the matching engine generates a notification of a match (30I), initiates/mediates contact between the parties (30J) and the matching process is completed (30K).

Figure 3:
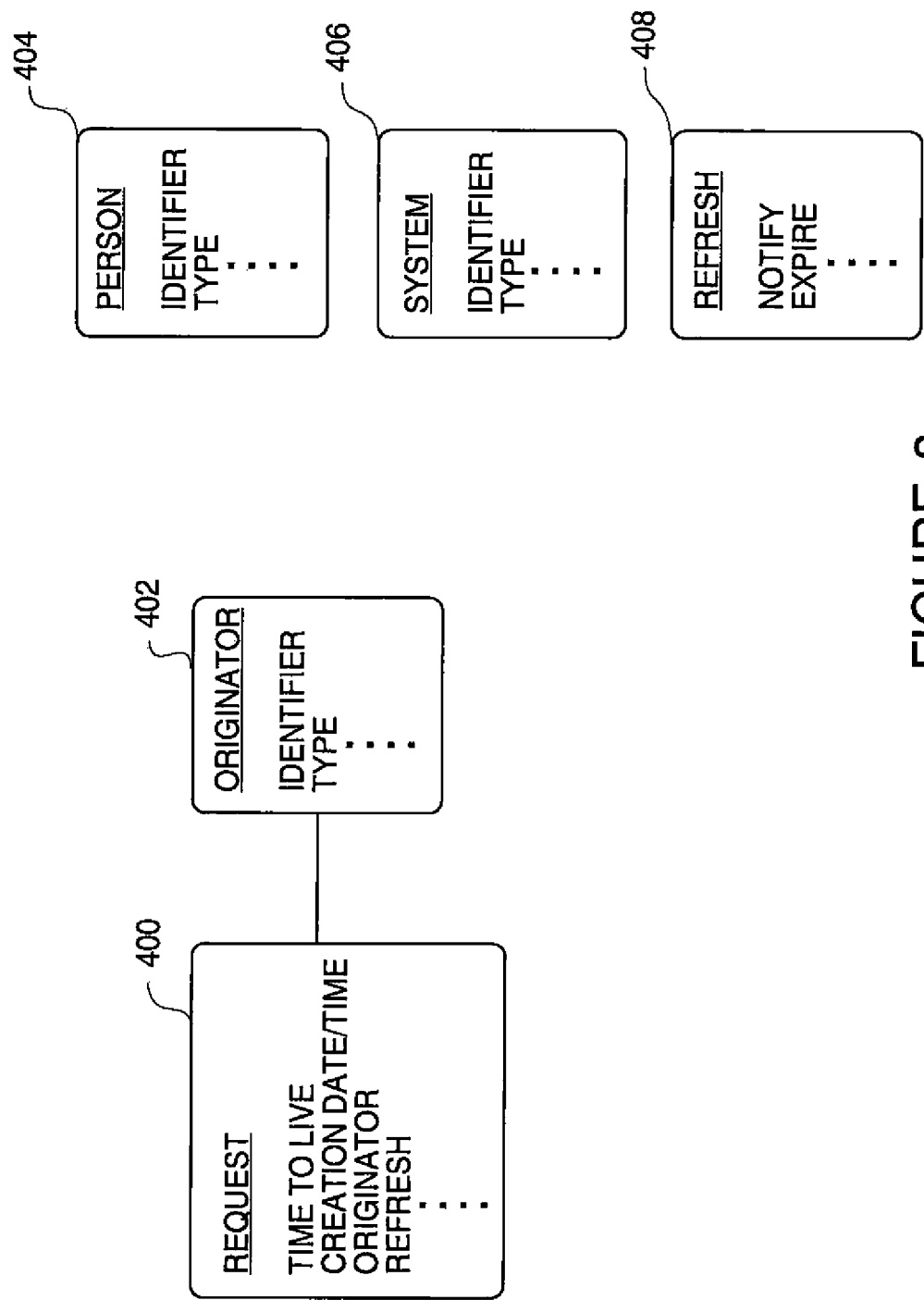
FIG. 3 shows an example of the data structures used for processing requests as shown in FIG. 2.

FIG. 3 shows an example of the data structures used for processing requests as shown in FIG. 2. As part of the internal structure that supports the management of requests, each request has a vector of information (a database record in one embodiment) and one item of which is an aging field (Time to Live) 400. This field allows the requests to be active for a period of time with the ability for the management system to either make the request active after the time limit, or to enforce requests back to the buyer for refreshing the requests. These data structures are used by the internal system, the matching engine, and the notification engine to manage requests. The system also may provide an intermediate identifier 402, 404, 406 so that the buyer and seller can remain anonymous, while providing this identifier for anonymous communication between the parties. These identifiers, once established, act as authentication and authorization proxies allowing requests to be processed. The system also may provide a refresh record 408 associated with each request that contains notify information (to identify the party to be notified about the particular request) and expire information that contains a time when the particular request expires.

Figure 4:
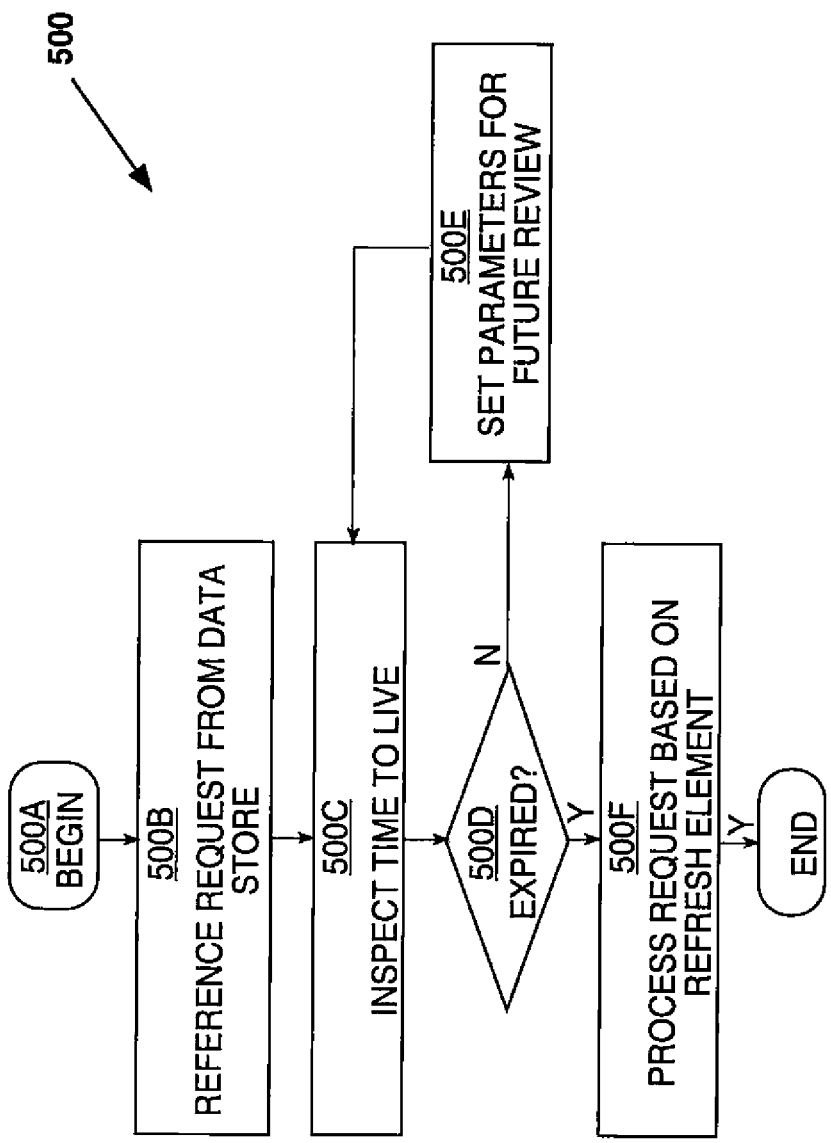
FIG. 4 illustrates a method for processing of a request from the request data store.

FIG. 4 illustrates a method 500 for processing of a request from the request data store that is carried out by the notification engine in one embodiment. The notification engine is used to asynchronously examine requests from the repository 214 (having the data structure as shown in FIG. 3) (500A, 500B) to determine if a time to live (notification to keep request alive) for a particular request has expired (500C, 500D). If the time to live has not expired, the request will remain in the active pool, parameters are set for future review (500E) and could potentially be matched with a product or service. If the time to live has expired, other parts of the data structure that make up the request will determine how the system will manage the expired request (500F) such as by using information in the refresh element.

Figure 5:
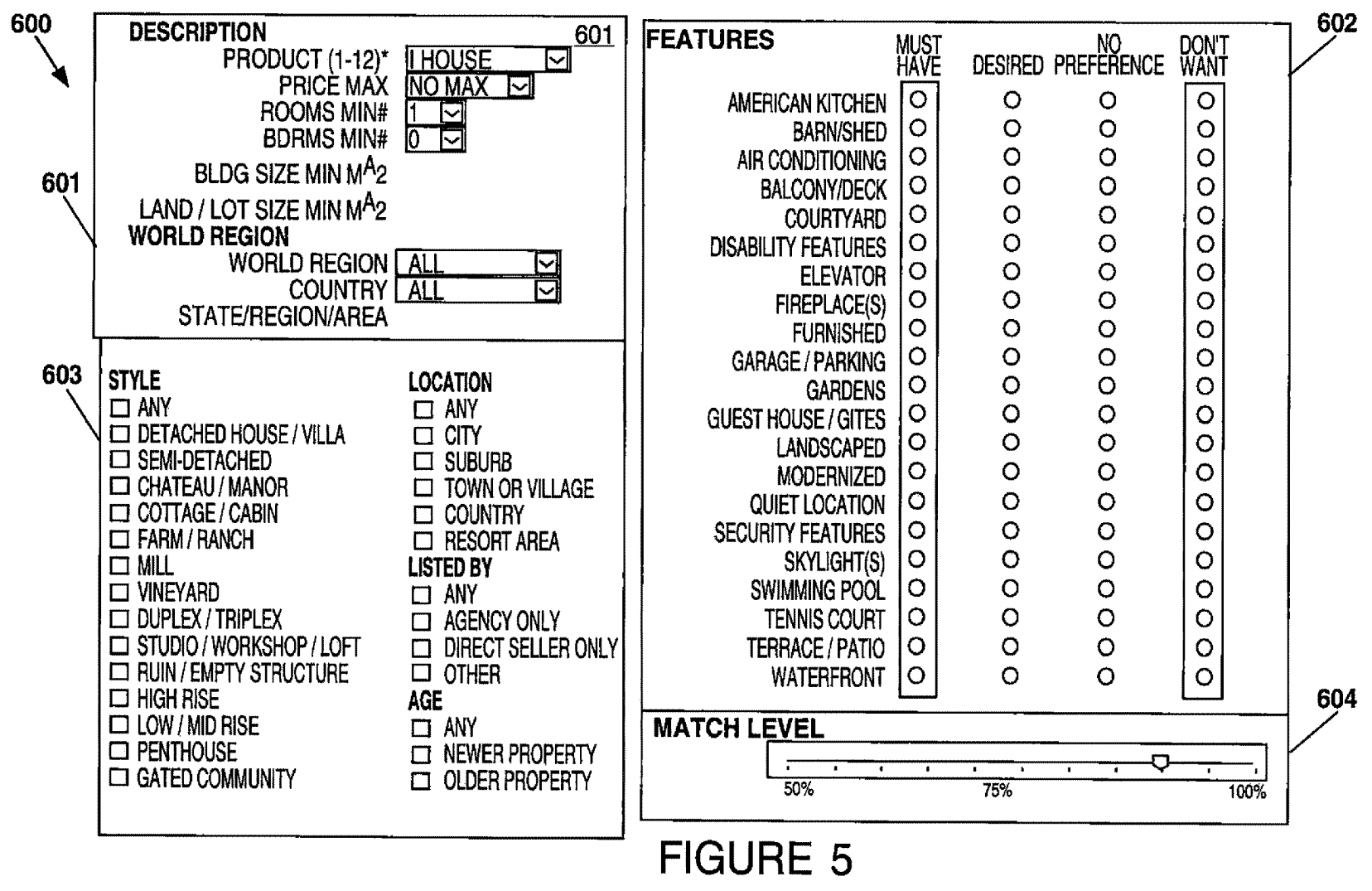

FIG. 5 is a sample user interface screen 600 that shows an implementation of the system and method with the purpose of transacting real estate transactions. The screen is an example of a screen for entering information about a real estate request that may be stored in the repository 214 shown in FIG. 1 for a real estate type transaction. The screen may include a description portion 601 that requests general information about the sought after real estate, a features portion 602 in which a buyer rates various "features" of a piece of real estate and a further details portion 603 that provides additional properties that the buyer can insert into the request. The screen may also include a match level portion 604 that allows the buyer to specify the percentage of match that must exist between the request and any potential matching real estate property. Once the information in the screen is entered into the system, it is stored in the repository 214 and then matched against any available real estate properties by the matching engine.

Figure 6:
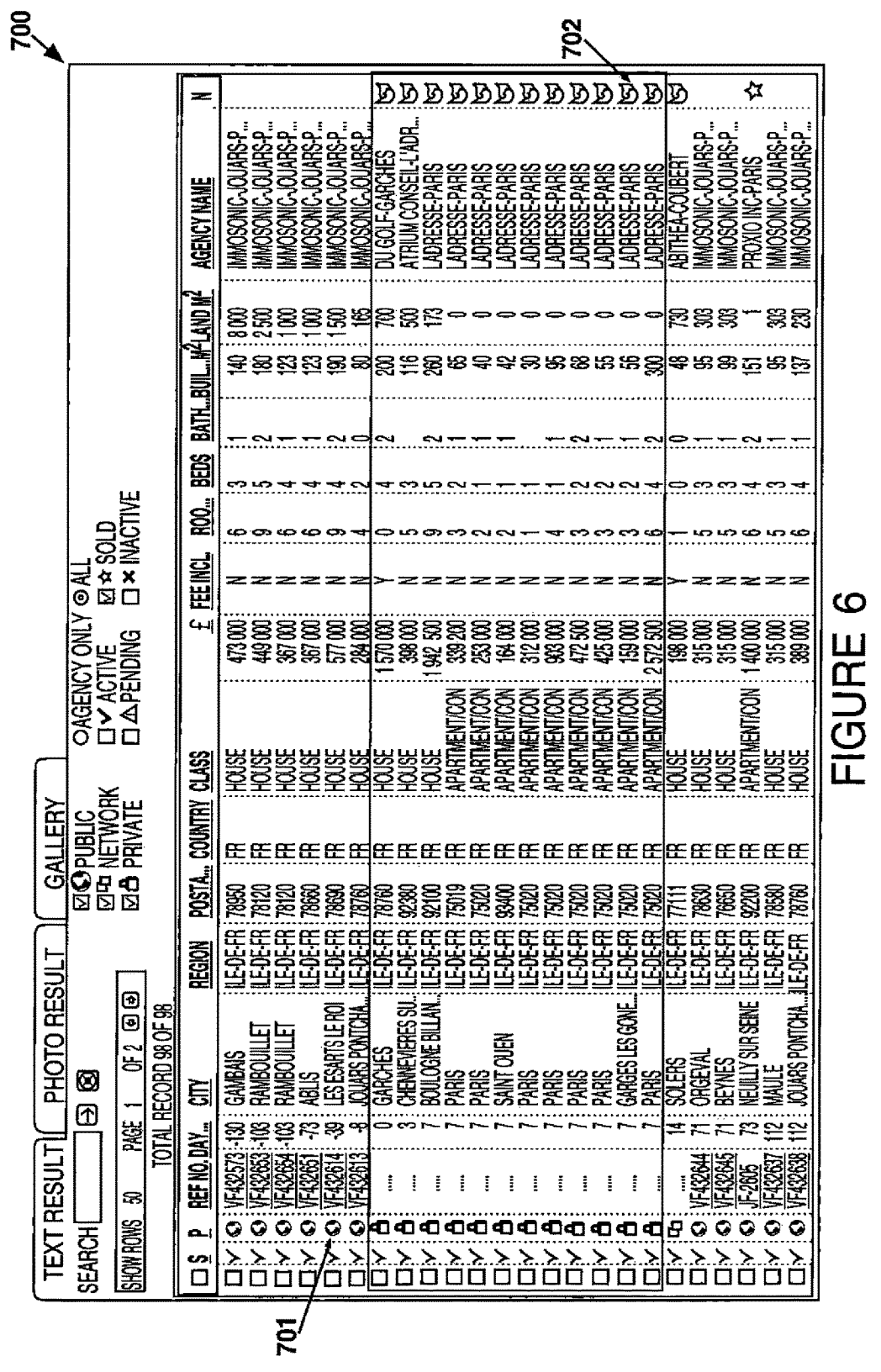

FIG. 6 is a sample user interface screen that shows an implementation of the system and method with the purpose of transacting real estate transactions through agents operating on behalf of buyers and sellers. The screen is an example screen for displaying information about properties stored in the repository 200 shown in FIG. 1A for a real estate type transaction. The screen may include a description portion that shows some general information about the properties including an indication of the privacy level/degree of exposure allowed for each property (701), and networking portion that shows information about the relationship between the agent representing the seller and the agent performing the search (702).

Now, two exemplary implementations of the system and method will be described.

First Exemplary Implementation

One exemplary implementation uses the system to manage private transactions for real estate property. This implementation maintains privacy but creates the opportunity to expose suitable properties to potential buyers.

1. Participants in the private market must be registered in the system, and contact information must be entered. Names and contact information will not be exposed or released by the system; it can only be exposed by the participants themselves on a case by case basis or by preauthorizing disclosure under certain specified conditions.

2. Registered buyers (Buyers) or registered agents (Agents) acting on behalf of buyers must post or search for want ads in the system by filling out a form to describe what they are looking for, and identifying the degree of match required.

3. Properties may be offered by either registered sellers (Sellers) or registered agents (Agents) acting on behalf of sellers. Sellers and Agents enter properties into the system by filling out the pages of the listing entry system or by authorizing data to be sent from another system. For each property entered, a choice is made about whether it will be a private or public listing. Sellers and Agents can choose to make a listing public or private at listing entry or at any time thereafter by editing an existing listing.

○ Public listings are published to the public website or other media in the normal way, and can be seen and searched by anyone.

○ Private listings are in the system but are not visible to anyone except the person or entity who listed them. The purpose for their entry is to make them searchable by the system itself, in order to make matches with Buyer or Agent searches or want ads. If made Private, only the Agent or Seller who posted the listing can decide who sees it. Seller or Agent must be proactive in disclosing Private listings to Buyers, and only "invited" Buyers can see the listing.

4. The system notifies Sellers and Agents when a Buyer want ad has been posted or a search initiated that matches one of their private listings, or when their newly entered private listing matches a previously posted want ad, based on the degree of match required by the Buyer. The system provides notifications, but will not reveal the details of the listing unless preauthorized to do so. Seller or Agent must be proactive in disclosing Private listings to Buyers.

○ Details of the matching want ads can be viewed, but Buyers are identified only by a number, code or other designation that maintains the privacy of the Buyer. Buyer readiness, qualifications and preferred language information also may be visible.

○ If they believe their listing fits a Buyer's requirements, Seller or Agent can send notification to Buyer via email or other stated contact means such contact information is not visible unless authorized by the Buyer) to invite the Buyer to view the listing. The property is identified only by a designation that maintains the privacy of the property (Number, code, etc.) but not specific address. Photos may be attached.

5. Registered Sellers/Agents with or without a current listing can search posted want ads at any time and see the details of the requests but can not see identifying information about the Buyers—Buyers are identified only by the designation. If they know of a property that might be of interest to the Buyer, they can enter it into the system and then send it to the Buyer as above. System filters apply (intelligence in the system filters responses and screens out abuse . . . X % of fields in sent items must match want ad). Only items within the system can be sent to Buyers, since no Buyer contact information is visible and delivery is made by the system.

6. To prevent "spamming," listings previously sent to a Buyer cannot be re-sent to the same Buyer unless requested (or will be blocked by the system.)

Second Exemplary Implementation

In another exemplary implementation, the system may be used to create and manage relationships between agents and sellers or agents and buyers (for example in real estate or other transactions utilizing agents such as employment) even if they have no prior knowledge of or established relationship with each other. This implementation creates an expanded opportunity for sellers to create a network of agents working on their behalf and to use any available agent, even those unknown to them, to help them find potential buyers (or in another example for companies to use agents to find candidates.)

Background: In most agency relationships, an entity, most commonly a seller or a buyer, contracts with an agent to provide a service for some fee or commission. (One example would be a homeowner contracting with a real estate agent to sell her house.) Typically, the agent advertises the product and seeks buyers. When a buyer is found, the agent is paid the agreed fee. Described as a reverse example: a company (the "buyer") contracts a headhunter (the agent) to find a candidate to fill a position. The agent is paid a fee to find an employee (the "product").

There are many cases where this is not the preferred way, such as in the following scenario, using the example of real estate:

1. Seller does not want to commit to paying high agency fees to sell their property, but wants to reach as many potential buyers as possible. The seller might, however, be willing to pay some commission or fixed fee to an agent for bringing a buyer and helping sell the property.

2. Buyer may not be aware of the system or availability of the property but is working with an Agent.

3. Agent has a set of buyers he is working with and wants to have knowledge of as many listings as possible to show to the buyers, and wants to be paid for assisting with as many transactions as possible. Agent wants to have an opportunity to bring a buyer to a seller and be paid, even if he has no prior knowledge of the seller or the property or any prior established relationship to that seller.

The Private Market system enables Sellers or an Agent acting on behalf of the Seller to display offers of compensation to all Agents, even when they have no prior agency relationship and no prior knowledge of each other, thus creating a potential network of agents working on their behalf and obligating them to pay a fee only if an agent actually assists them in closing a deal.

1. When entering or editing their public or private listing, Seller may check a field to offer compensation (fixed amount or percentage) to any Agent working on behalf of a Buyer. The information in the listing about commission offers and owner contact information are not publicly displayed even for public listings since such information is only available to registered agents.

2. Agents can search listings by "offered compensation" field. This field is not displayed to anyone other than registered Agents.

3. If an Agent has a buyer he thinks might be interested in buying a Seller's property, the Agent can notify the Seller through the system via blind email, requesting that the Seller sign a compensation agreement for the Agent of the buyer, or offering some other arrangement.

4. The Seller can choose to participate or not. If the Seller chooses to participate, he identifies himself and the two parties can then make a contract outside of the system and transact business.

Thus the system expands the opportunities for all entities and parties concerned, benefiting all parties by facilitating a relationship between previously unknown or unaffiliated parties. For example, the system provides more agents working to help the seller, more exposure of the property to buyers, and more fees to agents.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A private market system, comprising:
one or more buying parties, wherein each buying party interacts with the system using a processing unit based device;
one or more selling parties, wherein each selling party interacts with the system using a processing unit based device;
a computer that executes a private market unit;
a network capable of connecting the one or more buying parties and the one or more selling parties to the private market unit;
a database coupled to the private market unit that stores a privacy level for each offer, an intermediate identifier for each selling party and each buying party and a time to live for each offer, the privacy level including a public privacy level that permits the selling party, a network partner of the selling party and a member of the public to display the offer, a network privacy level that permits the selling party and the network partner of the selling party to display the offer, but does not permit the member of the public to display the offer and a private privacy level that permits the selling party to display the offer, but does not permit the network partner and the member of the public to display the offer; and the private market unit further comprising an offer repository storing one or more offers of products or services with a privacy level attached to each offer from the one or more selling parties selected from a decision matrix, the decision matrix having a privacy level of the product or service parameter being one of public, network private and private and a relationship level of requestor being one of owner, network partner and not a network partner wherein the private level attached to each offer is determined based on the privacy level of the product or service parameter and the relationship level of requestor wherein the privacy level is selected from one of the public privacy level, the network privacy level and the private privacy level, a request repository storing one or more requests for products or services from the one or more buying parties, an anonymity repository storing a set of anonymity parameters for each of the one or more buying parties, the one or more selling parties and one of the product and the service that is part of a transaction, a matching engine that matches a particular offer for one of the product and service in the offer repository with one or more requests for one of the product and service in the request repository based on the set of anonymity parameters for each of the one or more buying parties, the one or more selling parties and one of the product and the service that is part of the transaction which maintains the anonymity of the buying parties using the intermediate identifiers to generate a matching request and the selling party and a notification engine that notifies a buying party associated with the matching request of the match based on the privacy levels of the offers and the parameters stored in the anonymity repository for the selling party associated with the particular offer and the relationship between the buying party and the selling party and initiates the transaction based on the anonymity parameters.

2. The system of claim 1, wherein the anonymity repository further comprises a network group for each selling party wherein the network group identifies one or more network members who are one or more buying parties or one or more selling parties that are part of network for the selling party.

3. The system of claim 2, wherein the privacy level attached to each offer further comprises a public offer that is displayable to any buying party or any selling party, a network private offer that is displayable to the one or more network members of the selling party or a private offer that is displayable to the selling party.

4. The system of claim 3, wherein the anonymity repository stores a relationship level of a buying party and a selling party associated with a matched offer, wherein the relationship level further comprises an owner of the offer, a network member of the selling party or a buying party who is not a network member of the selling party.

5. The system of claim 4, wherein the notification engine displays the offer based on the relationship level between the selling party and the buying party and the privacy level of the offer.

6. The system of claim 5, wherein the notification engine displays the offer to the owner of the offer at all times.

7. The system of claim 5, wherein the notification engine displays an offer with a public privacy level to any buying party or any selling party.

8. The system of claim 5, wherein the notification engine displays an offer with a network private privacy level to the owner of the offer or one or more network members for the selling party of the offer.

9. The system of claim 5, wherein the notification engine displays an offer with a private privacy level to only the owner of the offer.

10. The system of claim 1, wherein the network further comprises the Internet.

11. The system of claim 10, wherein the private market unit further comprises one or more server computers that execute a plurality of lines of computer code.

12. The system of claim 1, wherein each buying party further comprises an individual, an entity, an agent of the individual or an agent of the entity.

13. The system of claim 1, wherein each selling party further comprises an individual, an entity, an agent of the individual or an agent of the entity.

14. The system of claim 1, wherein the offer repository, the request repository and the anonymity repository each further comprise a relational database.

15. The system of claim 1, wherein the matching engine refines a match if no match is located.

16. The system of claim 1, wherein the matching engine initiates contact between the selling party and the buying party.

17. The system of claim 1, wherein the privacy level for an offer is changeable by the owner of the offer.

18. A computer implemented private marketing method using a private market system between one or more buying parties and one or more selling parties who are connected by a private market unit, the method comprising:

storing, in a database coupled to the private market unit, a privacy level for each offer, an intermediate identifier for each selling party and each buying party and a time to live for each offer, the privacy level including a public privacy level that permits the selling party, a network partner of the selling party and a member of the public to display the offer, a network privacy level that permits the selling party and the network partner of the selling party to display the offer, but does not permit the member of the public to display the offer and a private privacy level that permits the selling party to display the offer, but does not permit the network partner and the member of the public to display the offer;

storing, in an offer repository that is part of the private market unit, one or more offers of products or services with a privacy level attached to each offer from the one or more selling parties selected from a decision matrix, the decision matrix having a privacy level of the product or service parameter being one of public, network private and private and a relationship level of requestor being one of owner, network partner and not a network partner wherein the private level attached to each offer is determined based on the privacy level of the product or service parameter and the relationship level of requestor wherein the privacy level is selected from one of the public privacy level, the network privacy level and the private privacy level;

storing, in a request repository that is part of the private market unit, one or more requests for products or services from the one or more buying parties;

storing a set of anonymity parameters for each of the one or more buying parties, the one or more selling parties and one of the product and the service that is part of a transaction;

matching, by a matching engine that is part of the private market unit, a particular offer for one of the product and service in the offer repository with one or more requests for one of the product and service in the request repository based on the set of anonymity parameters for each of the one or more buying parties, the one or more selling parties and one of the product and the service that is part of the transaction which maintains the anonymity of the buying parties using the intermediate identifiers to generate a matching request and the selling party; and notifying, by a notification engine that is part of the private market unit, a buying party associated with the matching request of the match based on the privacy levels of the offers and the parameters stored in the anonymity repository for the selling party associated with the particular offer and the relationship between the buying party and the selling party and initiates the transaction based on the anonymity parameters.

19. The method of claim 18, wherein the privacy level for an offer is changeable by the owner of the offer.

20. The method of claim 18, wherein the anonymity repository further comprises a network group for each selling party wherein the network group identifies one or more network members who are one or more buying parties or one or more selling parties that are part of network for the selling party.

21. The method of claim 20, wherein the privacy level attached to each offer further comprises a public offer that is displayable to any buying party or any selling party, a network private offer that is displayable to the one or more network members of the selling party or a private offer that is displayable to the selling party.

22. The method of claim 21 further comprising storing a relationship level of a buying party and a selling party associated with a matched offer, wherein the relationship level further comprises an owner of the offer, a network member of the selling party or a buying party who is not a network member of the selling party.

23. The method of claim 22, wherein notifying a buying party further comprises displaying the offer based on the relationship level between the selling party and the buying party and the privacy level of the offer.

24. The method of claim 23, wherein displaying the offer based on the relationship level between the selling party and the buying party and the privacy level of the offer further comprises displaying the offer to the owner of the offer at all times.

25. The method of claim 23, wherein displaying the offer based on the relationship level between the selling party and the buying party and the privacy level of the offer further comprises displaying an offer with a public privacy level to any buying party or any selling party.

26. The method of claim 23, wherein displaying the offer based on the relationship level between the selling party and the buying party and the privacy level of the offer further comprises displaying an offer with a network private privacy level to the owner of the offer or one or more network members for the selling party of the offer.

27. The method of claim 23, wherein displaying the offer based on the relationship level between the selling party and the buying party and the privacy level of the offer further comprises displaying offer with a private privacy level to only the owner of the offer.

28. The method of claim 18, wherein each buying party further comprises an individual, an entity, an agent of the individual or an agent of the entity.

29. The method of claim 18, wherein each selling party further comprises an individual, an entity, an agent of the individual or an agent of the entity.

30. The method of claim 18, wherein matching a particular offer in the offer repository with one or more requests in the request repository while maintaining the anonymity of the buying parties further comprises refining a match if no match is located.

31. The method of claim 18, wherein matching a particular offer in the offer repository with one or more requests in the request repository while maintaining the anonymity of the buying parties further comprises initiating contact between the selling party and the buying party.

32. The system of claim 1, wherein each processing unit based device further comprises a server computer, a personal computer, a personal digital assistant device, a converged electronic device, a cellular phone device or a mobile phone device.

\* \* \* \* \*

UNITED STATES PATENT AND TRADEMARK OFFICE
CERTIFICATE OF CORRECTION

PATENT NO. : 10,395,288 B2  
APPLICATION NO. : 12/166157  
DATED : August 27, 2019  
INVENTOR(S) : Case and Spicer Page 1 of 1

It is certified that error appears in the above-identified patent and that said Letters Patent is hereby corrected as shown below:

On the Title Page

Please add inventor's name (72): Janet E. Case Palo Alto, CA and Peter Spicer Spokane, Washington Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*